United States Patent
Keenan

(10) Patent No.: US 9,149,951 B2
(45) Date of Patent: Oct. 6, 2015

(54) DUST COLLECTION ASSEMBLY AND A TENSIONING SYSTEM FOR A SAW

(71) Applicant: Nomis LLC, Elgin, IL (US)

(72) Inventor: Richard F. Keenan, Wakefield, RI (US)

(73) Assignee: Nomis LLC, Palatine, IL (US)

( * ) Notice: Subject to any disclaimer, the term of this patent is extended or adjusted under 35 U.S.C. 154(b) by 288 days.

(21) Appl. No.: 13/779,820

(22) Filed: Feb. 28, 2013

(65) Prior Publication Data

US 2013/0220092 A1  Aug. 29, 2013

Related U.S. Application Data

(60) Provisional application No. 61/604,717, filed on Feb. 29, 2012.

(51) Int. Cl.
*B26D 7/18* (2006.01)
*B27B 5/29* (2006.01)
*F16M 13/00* (2006.01)
*B23D 59/00* (2006.01)

(52) U.S. Cl.
CPC ............... *B27B 5/29* (2013.01); *B23D 59/006* (2013.01); *F16M 13/00* (2013.01); *B26D 7/18* (2013.01); *B26D 7/1863* (2013.01); *Y10T 83/207* (2015.04); *Y10T 83/2218* (2015.04)

(58) Field of Classification Search
CPC ........ B23D 59/006; B27B 5/29; F16M 13/00; Y10T 83/207; Y10T 83/2218; Y10T 83/96; B26D 7/18; B26D 7/1863
See application file for complete search history.

(56) References Cited

U.S. PATENT DOCUMENTS

| | | | | |
|---|---|---|---|---|
| 3,958,474 A | * | 5/1976 | Kreitz | 83/100 |
| 5,063,805 A | | 11/1991 | Brundage | 83/468.3 |
| 5,819,619 A | | 10/1998 | Miller et al. | 83/100 |
| 5,931,072 A | | 8/1999 | Shibata | 83/98 |
| 6,427,570 B1 | | 8/2002 | Miller et al. | 83/100 |
| 6,431,040 B1 | | 8/2002 | Miller et al. | 83/100 |
| 6,510,772 B2 | | 1/2003 | Brickner, Jr. et al. | 83/100 |
| 6,988,435 B2 | | 1/2006 | Kao | 83/100 |
| 7,204,178 B2 | | 4/2007 | Bergmann | 83/162 |
| 7,216,572 B2 | | 5/2007 | Keenan | 83/100 |
| 7,222,560 B2 | | 5/2007 | Parks et al. | 83/165 |
| 7,789,003 B2 | | 9/2010 | Chen | 83/100 |
| 7,802,505 B2 | | 9/2010 | Hetcher et al. | 83/100 |
| 7,905,260 B2 | | 3/2011 | Keenan | 144/252.1 |
| 8,272,304 B2 | | 9/2012 | Lawlor et al. | 83/100 |
| 2006/0230898 A1 | * | 10/2006 | Brunson et al. | 83/100 |

* cited by examiner

*Primary Examiner* — Stephen Choi
(74) *Attorney, Agent, or Firm* — Reinhart Boerner Van Deuren P.C.

(57) ABSTRACT

A saw (100) includes a sawdust collection assembly (2) having a chute (10) made of a material having a stretchability to be shaped responsive to movement of a blade housing (102) into a moveable sawdust path. An upper end (40) of a top portion (6) of the chute (10) is removably and reattachably engaged with a top attachment member (36) mounted to the blade housing (102). A bottom portion (8) of the chute (10) is removably and reattachably engaged with a bottom attachment member (26) mounted to a rear side (106C) of a fence (106) of the saw (100). Two side edges (44, 46) of the top portion (6) are respectively attached by two side tension cords (18) to left and right sides (106B, 106A) of the fence (106). One of the side tension cords (18) can be used with a tension block (20, 28) to form a tensioning system.

19 Claims, 3 Drawing Sheets

FIG.3

DUST COLLECTION ASSEMBLY AND A TENSIONING SYSTEM FOR A SAW

CROSS-REFERENCE TO RELATED APPLICATIONS

This application is related to and claims benefit of U.S. Provisional Application No. 61/604,717 filed Feb. 29, 2012.

BACKGROUND

A sawdust collection assembly for a saw is shown for collecting sawdust and, more particularly, for saws of various types in collecting sawdust. A tensioning system used in attaching the sawdust collection assembly is also shown.

Users have typically had to cope with the very high volume of flying sawdust particles and wood chips generated by miter saws and other saws. According to the National Institute for Occupational Safety and Health (NIOSH), wood dust particles are known to cause health problems including eye and skin irritation, allergy, reduced lung function, asthma, and nasal cancer. Further, wood dust is known to be a human carcinogen. As a result, in order to protect themselves, workers have undertaken the cutting of wood outdoors, wearing masks, building makeshift containers, enclosing the rear portion of the saw or building plastic enclosures around their work area. One difficulty that arises is that cutting wood outdoors is often limited by poor weather conditions. As a result, work schedules are often disrupted when conditions do not permit cutting outdoors. Additionally, dust particles and wood chips that drop to the ground are frequently tracked into living areas of the home and get lodged in carpets and in furnishings where they can create an unhealthy environment.

A wide variety of sawdust collection assemblies has been designed to collect sawdust generated by saws. However, these sawdust collection assemblies are expensive and can only be used with saws of specific types. Namely, none of them are a universal fit. Furthermore, many of the sawdust collection assemblies can cover just a small portion of the dust path area or result in a significant gap in the coverage of the dust path, causing the escape of substantial amounts of sawdust. Further, installation of the sawdust collection assemblies are troublesome and difficult to adjust according to the positions of the components of the saws associated with the saw dust collection assemblies. Further, the sawdust collection effect is not always satisfactory in various wood cutting conditions including the depth of cut, the size of the work piece, the angle of the cut, the bevel angle, the size and speed of the saw blade, how quickly the saw blade is pushed into the work piece by the saw operator and especially when a singular cutting operation involves a combination of any and all of these cutting variables.

Accordingly, there is a need to provide a dust collection assembly that is easily adaptable to any make, model or type of miter saw that will capture sawdust that travels across a dust path that is higher and wider than the evacuation paths of virtually all dust chutes, exhausts and funnels that have been designed for saws to date. In addition, there is a need for a sawdust collecting assembly that will be proximate to the actual cutting action of the saw blade regardless of the cutting conditions. Further, there is a need for a sawdust collection assembly that will collect virtually all of the sawdust, does not require the removal of existing structures, will work in combination with a variety of vacuum sources, is easy to install, is easy to adjust and is inexpensive to manufacture.

BRIEF SUMMARY

These needs and other problems in the field of effective, inexpensive, and easy-to-install sawdust collectors are solved by providing, in an aspect, a sawdust collection assembly including a chute having top and bottom portions. A bottom end of the bottom portion is spaced from an upper end of the top portion along a first axis. The top portion further includes first and second side edges spaced from each other along a second axis perpendicular to the first axis. The chute is formed of a material having a stretchability to be shaped responsive to movement of a blade housing of a saw into a moveable sawdust path. The moveable sawdust path is adapted to be in communication with a dust evacuation port in the blade housing of the saw. A top attachment member is flexible and adapted to be mounted to the blade housing of the saw and has a shape approximating the blade housing. The upper end of the top portion is removably and reattachably engaged with the top attachment member. A bottom attachment member is flexible and is adapted to be mounted to a rear side of a fence of the saw and has a shape approximating the rear side of the fence. The bottom portion is removably and reattachably engaged with the bottom attachment member. The bottom attachment member is located below the top attachment member along the first axis. A first end of a first side tension cord is attached to at least one first attachment location at the first side edge of the top portion. A second end of the first side tension cord is adapted to be attached to a left side of the fence of the saw. A first end of a second side tension cord is attached to at least one second attachment location at the second side edge of the top portion. A second end of the second side tension cord is adapted to be attached to a right side of the fence of the saw. The rear side of the fence is located between the left and right sides of the fence.

In another aspect, a saw is provided and includes a blade housing having a dust evacuation port adapted to be connected to a vacuum. A saw blade is rotatably supported in the blade housing. The saw further includes a fence having left and right sides and a rear side between the left and right sides. The saw further includes a chute having top and bottom portions. A bottom end of the bottom portion is spaced from an upper end of the top portion along a first axis. The top portion further includes first and second side edges spaced from each other along a second axis perpendicular to the first axis. The chute is formed of a material having a stretchability to be shaped responsive to movement of the blade housing into a moveable sawdust path in communication with the dust evacuation port in the blade housing. A top attachment member is flexible and mounted to the blade housing of the saw and has a shape approximating the blade housing. The upper end of the top portion is removably and reattachably engaged with the top attachment member. A bottom attachment member is flexible and is mounted to the rear side of the fence of the saw and has a shape approximating the rear side of the fence. The bottom portion is removably and reattachably engaged with the bottom attachment member. The bottom attachment member is located below the top attachment member along the first axis. A first end of a first side tension cord is attached to at least one first attachment location at the first side edge of the top portion. A second end of the first side tension cord is attached to the left side of the fence of the saw. A first end of a second side tension cord is attached to at least one second attachment location at the second side edge of the top portion. A second end of the second side tension cord is attached to the right side of the fence of the saw.

In a form shown, a first side bar is elastic and mounted to and extends along the first side edge of the top portion and defines a plurality of first attachment locations spaced from each other along the first axis and along the first side bar. A second side bar is elastic and mounted to and extends along the second side edge of the top portion and defines a plurality of second attachment locations spaced from each other along the first axis and along the second side bar. First and second tension blocks are respectively fixed to the left and right sides of the fence by attachment mechanisms. The first end of the first side tension cord is releasably attached to one of the plurality of first attachment locations by a first hook. The first end of the second side tension cord is releasably attached to one of the plurality of second attachment locations by a second hook. The second ends of the first and second side tension cords are respectively fixed to the first and second tension blocks.

In the form shown, the top portion is made of a material having a stretchability of approximately 200% along the first axis and approximately 100% along the second axis, and the bottom portion is made of a material having a stretchability of approximately 100% along the first axis and approximately 60% along the second axis.

In the form shown, a saw attachment member is fixed to the upper end of the top portion. The saw attachment member is flexible and includes a plurality of loops removably and reattachably engaged with a plurality of hooks of the top attachment member. The bottom portion of the chute includes a surface having a plurality of loops releasably and reattachably engaged with a plurality of hooks of the bottom attachment member. The bottom portion of the chute further includes third and fourth side edges extending between a top end and the bottom end of the bottom portion. The third and fourth side edges are linearly aligned with the first and second side edges, respectively. The chute is substantially trapezoidal. The top portion has a smooth surface for deflecting sawdust generated during operation of the saw blade.

In the form shown, a window is mounted in the top portion of the chute and located between the first and second side edges of the top portion. The window forms a part of the chute. A rear tension cord extends through the window and is attached to the saw. The rear tension cord has an adjustable length to adjust a tension imparted to the window.

In a further aspect, a tensioning system is provided and includes a tension block and a tension cord. The tension block includes a first side and a second side opposite to the first side in a thickness direction. A through-hole extends from the first side through the second side. The tensioning block further includes a first edge and a second edge opposite to the first edge in a length direction perpendicular to the thickness direction. The first and second edges extend between the first and second sides. A first slot extends from the first edge towards but spaced from the second edge. A second slot extends from the second edge towards but spaced from the first edge. The second slot is aligned with the first slot. The through-hole is spaced from and located between the first and second slots. The tension block is adapted to be fixed to a first object. The tension cord has an initial diameter when not tensioned. The tension cord has a reduced diameter when tensioned. The reduced diameter is smaller than the initial diameter and substantially equal to a width of each of the first and second slots in a width direction perpendicular to the length and thickness directions. A diameter of the through-hole is at least two times the initial diameter of the tension cord. The tension cord includes a first end fixed to the tension block and extending through the through-hole and extending through at least one of the first and second slots. A second end of the tension cord is adapted to be attached to a second object. The tension cord is adapted to impart a tension to the second object. The tension cord is made of a stretchable and retractable cord material capable of retaining stretchability and shape after repeated use. The tension cord is adapted to restore the initial diameter after the tension vanishes.

Illustrative embodiments will become clearer in light of the following detailed description described in connection with the drawings.

DESCRIPTION OF THE DRAWINGS

The illustrative embodiments may best be described by reference to the accompanying drawings where:

FIG. 3 shows a partial, side view of the saw of FIG. 2, with the saw dust collection assembly cross sectioned.

Figure 1:
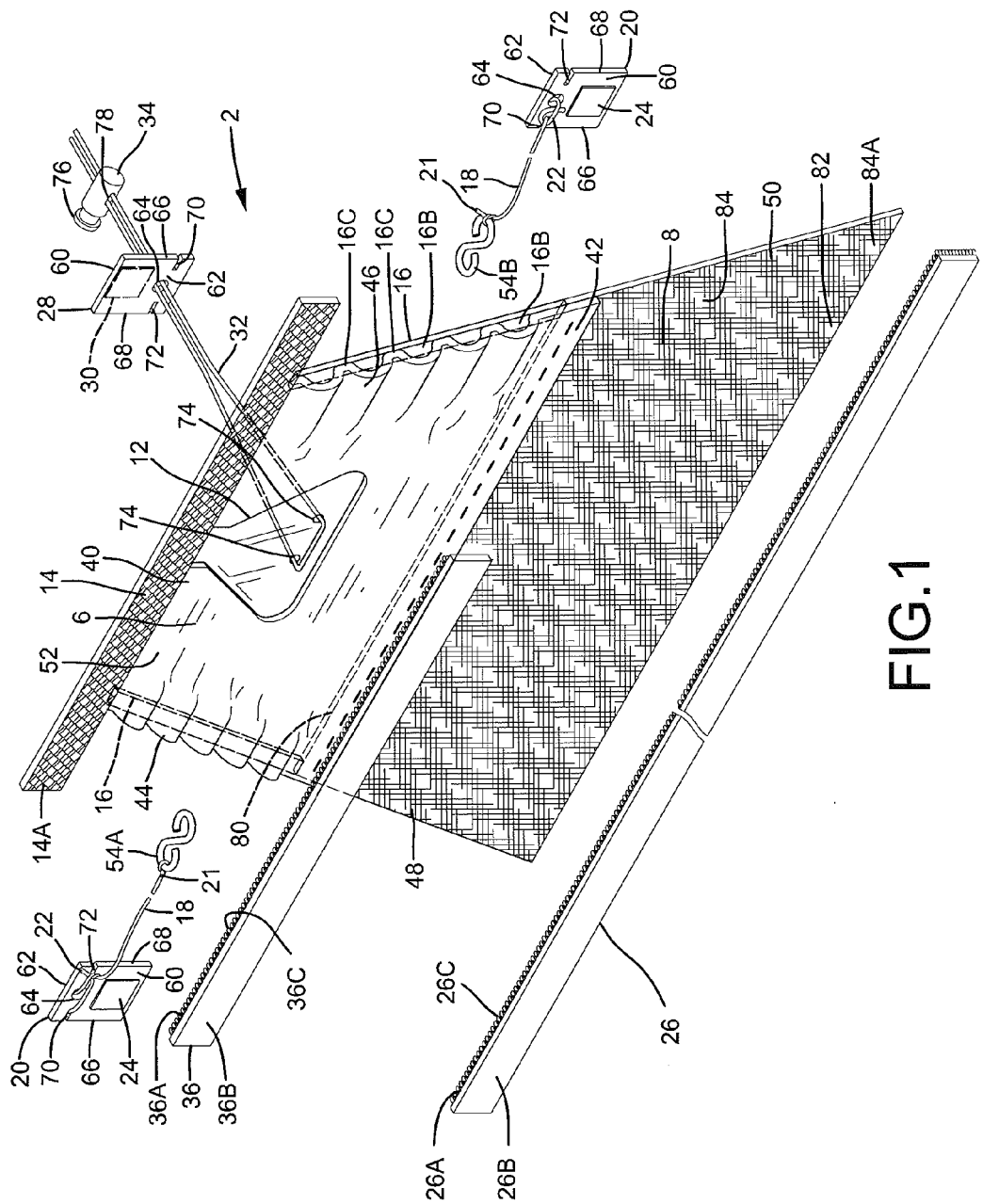
FIG. 1 shows an exploded, perspective view of a sawdust collection assembly.
Figure 2:
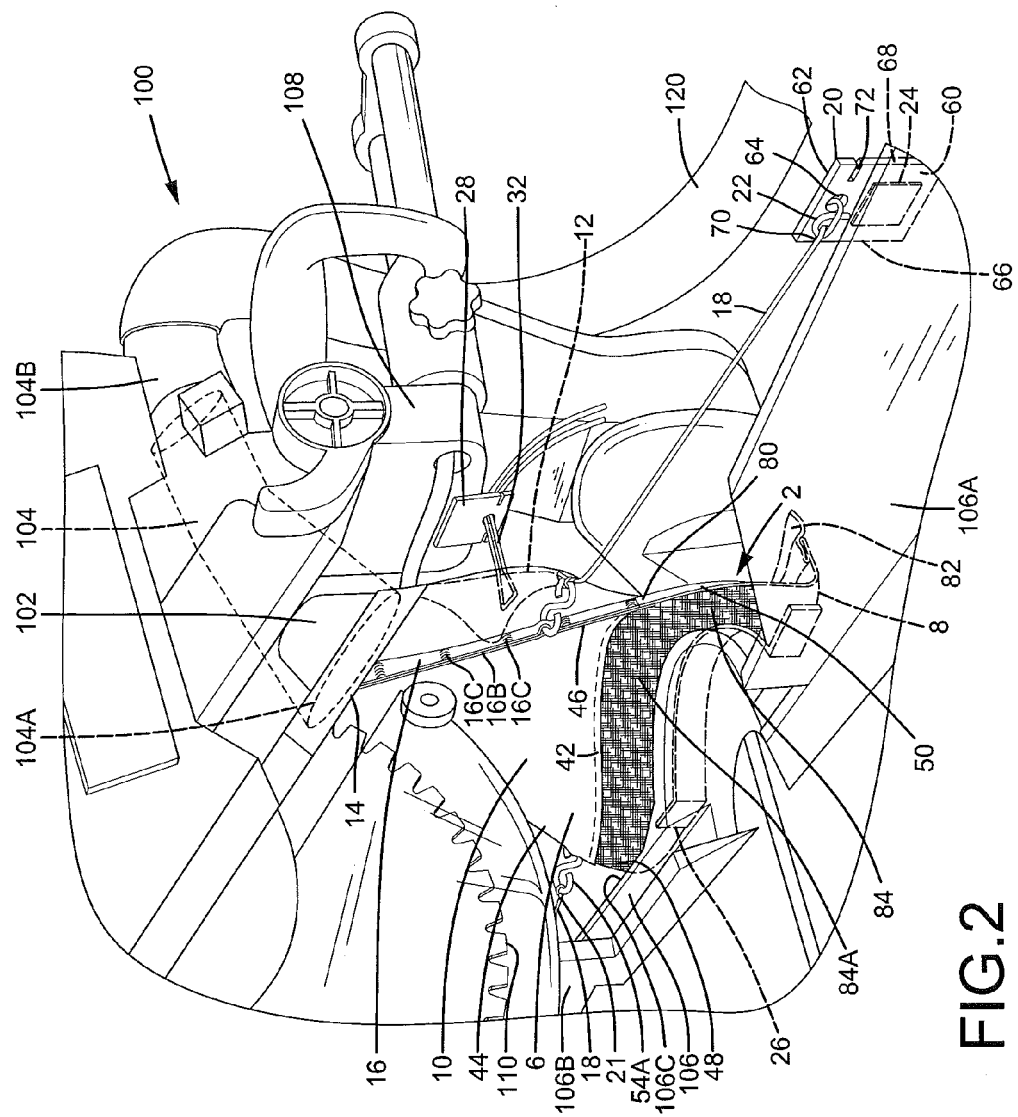
FIG. 2 shows a partial, perspective view of a saw and the sawdust collection assembly of FIG. 1.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "lower", "upper", "top", "bottom", "side", "end", "edge", "portion", "section", "horizontal", "vertical", "length", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION

A saw is shown in the drawings and generally designated 100. According to the form shown, saw 100 is in the form of a miter saw and includes a blade housing 102 having a dust evacuation conduit 104. Dust evacuation conduit 104 has a first end 104A serving as a dust evacuation port in blade housing 102 for receiving sawdust. Dust evacuation conduit 104 further has a second end 104B connected to a connectable vacuum hose 120. Connectable vacuum hose 120 is adapted to be connected to a vacuum. Saw 100 further includes a saw blade 110 rotatably supported in blade housing 102. Saw 100 further includes a fence 106 having left and right sides 106B and 106A and a rear side 106C between left and right sides 106B and 106A. Saw 100 further includes a slide rail end cap 108 spaced from blade housing 102. Although saw 100 is a sliding miter saw in the form shown, it can be appreciated that saw 100 can be of any form as conventional including but not limited to of a commercially available type.

According to the form shown, saw 100 further includes a sawdust collection assembly 2 including a chute 10 formed of a material having a stretchability to be shaped responsive to movement of blade housing 102 into a moveable sawdust path in communication with the dust evacuation port of blade housing 102. In the form shown, chute 10 includes a top portion 6 having an upper end 40 and a lower end 42 spaced from upper end 40 along a first axis. Top portion 6 further includes first and second side edges 44 and 46 spaced from each other along a second axis perpendicular to the first axis. Top portion 6 further includes a surface 52. Surface 52 is smooth and adapted to deflect sawdust generated during operation of saw blade 110 of saw 100. Top portion 6 is elastic and stretchable along the first and second axes. A saw attachment member 14 is fixed to upper end 40 of top portion 6 and is flexible. In the form shown, saw attachment member 14 includes a plurality of loops 14A on one or two faces thereof.

Figure 3:
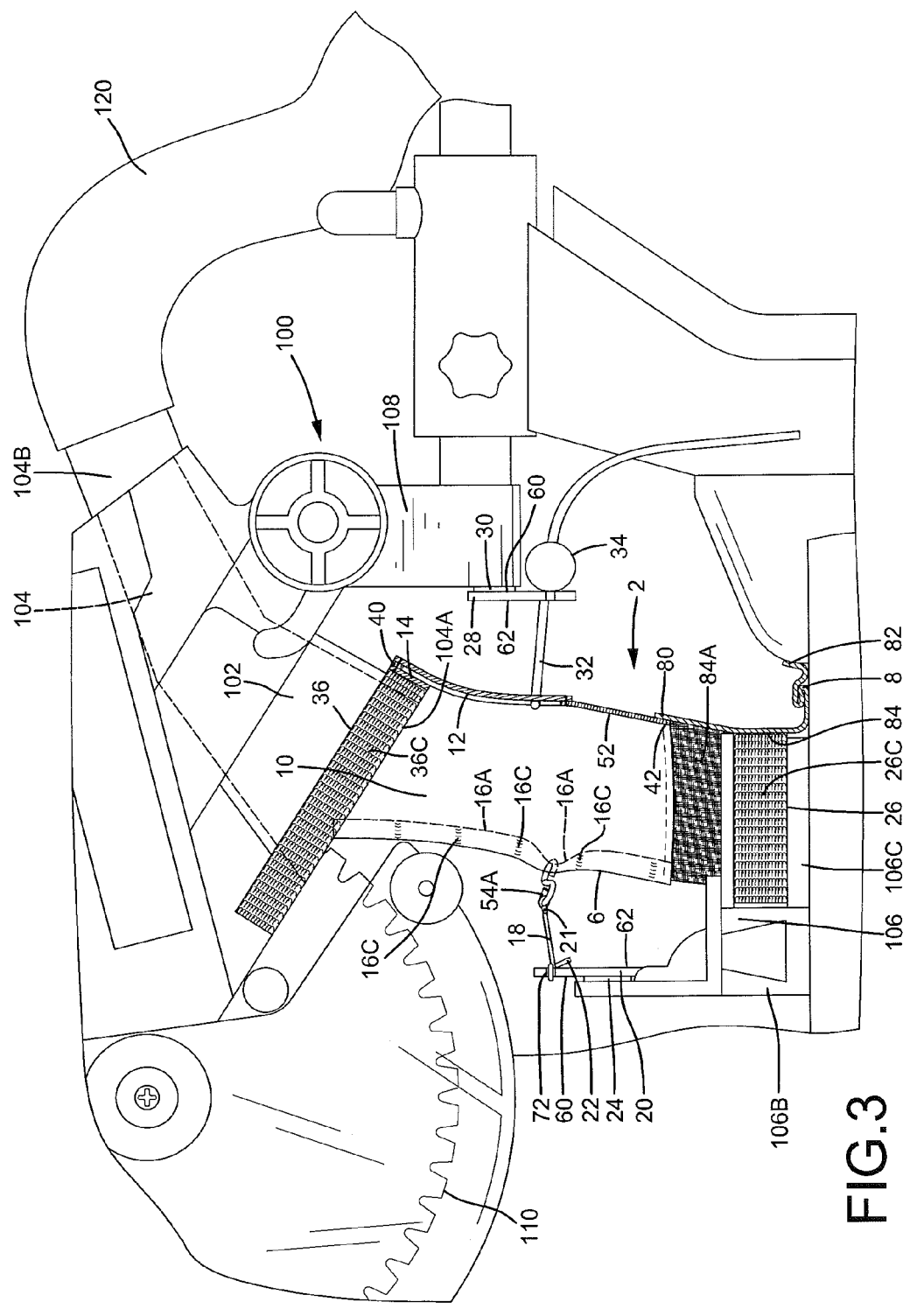

According to the form shown, at least one first attachment location is formed at first side edge 44 of top portion 6, and at least one first attachment location is formed at second side edge 46 of top portion 6. In the form shown, a first side bar 16 is mounted to and extends along first side edge 44 of top portion 6. First side bar 16 defines a plurality of first attachment locations 16A (FIG. 3) at first side edge 44 and spaced from each other along the first axis and along first side bar 16. First side bar 16 is an elastic bar sewn to first side edge 44 at a plurality of spaced stitching locations 16C (FIG. 3). Each first attachment location 16A is located between two adjacent stitching locations 16C of first side bar 16. A second side bar 16 is mounted to and extends along second side edge 46. Second side bar 16 defines a plurality of second attachment locations 16B at second side edge 46 and spaced from each other along the first axis and along second side bar 16. Second side bar 16 is an elastic bar sewn to second side edge 46 at a plurality of spaced stitching locations 16C. Each second attachment location 16B is located between two adjacent stitching locations 16C of second side bar 16.

According to the form shown, chute 10 further includes a bottom portion 8 having a top end 80 and a bottom end 82 spaced along the first axis. Top end 80 of bottom portion 8 is fixed to lower end 42 of top portion 6. Bottom portion 8 further includes third and fourth side edges 48 and 50 extending between top and bottom ends 80 and 82. Third side edge 48 is linearly aligned with first side edge 44 of top portion 6. Fourth side edge 50 is linearly aligned with second side edge 46 of top portion 6. Bottom portion 8 further includes a surface 84 having a plurality of loops 84A in the form shown. Bottom portion 8 is elastic and stretchable along the first and second axis. A length of bottom end 82 of bottom portion 8 along the second axis is larger than a length of upper end 40 of top portion 6 along the second axis. A length of top end 80 of bottom portion 8 along the second axis is equal to a length of lower end 42 of top portion 6 along the second axis. Thus, chute 10 is substantially trapezoidal.

According to the form shown, top portion 6 is made of a material having a stretchability of approximately 200% along the first axis and approximately 100% along the second axis, such as a four way stretch spandex. Bottom portion 8 is made of a material having a stretchability of approximately 100% along the first axis and approximately 60% along the second axis, such as a four way stretch spandex.

According to the form shown, sawdust collection assembly 2 further includes a top attachment member 36 including a first side 36A having a plurality of hooks 36C and a second side 36B fixed to blade housing 102. Top attachment member 36 is flexible and has a shape approximating blade housing 102. Second side 36B can include an adhesive for bonding to blade housing 102. However, other provisions for fixing second side 36B to blade housing 102 can be used. Loops 14A of saw attachment member 14 are releasably and reattachably engaged with hooks 36C of top attachment member 36. Thus, upper end 40 of top portion 6 is removably and reattachably engaged with top attachment member 36, with surface 52 of top portion 6 facing top attachment member 36.

According to the form shown, sawdust collection assembly 2 further includes a bottom attachment member 26 having a shape approximating rear side 106C of fence 106. Bottom attachment member 26 is flexible and includes a first side 26A having a plurality of hooks 26C and a second side 26B fixed to rear side 106C of fence 106. Second side 26B can include an adhesive for bonding to rear side 106C of fence 106. However, other provisions for fixing second side 26B to rear side 106C of fence 106 can be used. Loops 84A of surface 84 of bottom portion 8 are removably and reattachably engaged with hooks 26C of bottom attachment member 26, with bottom attachment member 26 located below top attachment member 36 along the first axis, and with surface 84 of bottom portion 8 facing rear side 106C of fence 106. In the form shown, bottom portion 8 is attached to bottom attachment member 26 at a location between top and bottom ends 80 and 82. However, bottom portion 8 can be attached to bottom attachment member 26 at a location adjacent to top end 80 or bottom end 82 in response to the attachment location of saw 100.

According to the form shown, sawdust collection assembly 2 further includes first and second tension blocks 20 and a rear tension block 28. Each of first and second tension blocks 20 and rear tension block 28 includes a first side 60 and a second side 62 opposite to first side 60 in a thickness direction. A through-hole 64 extends from first side 60 through second side 62. Each of first and second tension blocks 20 and rear tension block 28 further includes a first edge 66 and a second edge 68 opposite to first edge 66 in a length direction perpendicular to the thickness direction. First and second edges 66 and 68 extend between first and second sides 60 and 62. A first slot 70 extends from first edge 66 towards but spaced from second edge 68. A second slot 72 extends from second edge 68 towards but spaced from first edge 66. Second slot 72 is aligned with first slot 70. Through-hole 64 is spaced from and located between first and second slots 70 and 72. Each of first and second slots 70 and 72 has a width in a width direction perpendicular to the length and thickness directions. A diameter of through-hole 64 of each of first and second tension blocks 20 and rear tension block 28 is at least two times the diameter of each of first and second slots 70 and 72. An attachment mechanism 24 and 30 is provided on first side 60 of each of first and second tension blocks 20 and rear tension block 28. First tension block 20 is fixed to left side 106B of fence 106 by its attachment mechanism 24. Second tension block 20 is fixed to right side 106A of fence 106 by its attachment mechanism 24. Rear tension block 28 is fixed to slide rail end cap 108 of saw 100 by its attachment mechanism 30. Each of attachment mechanisms 24 and 30 is in the form of an adhesive pad in the form shown. Nevertheless, other forms of attachment arrangements can be used, such as gluing, screwing, welding, male/female coupling, buckling, etc.

According to the form shown, sawdust collection assembly 2 further includes a first side tension cord 18 having first and second ends 21 and 22. First end 21 of first side tension cord 18 is releasably attached to one of first attachment locations 16A at first side edge 44 by a first hook 54A. Second end 22 of first side tension cord 18 is attached to first tension block 20 fixed to left side 106B of fence 106. Specifically, second end 22 of first side tension cord 18 extends through through-hole 64 and at least one of first and second slots 70 and 72 of first tension block 20. A length of first side tension cord 18 between first hook 54A and first tension block 20 can be adjusted to adjust a tension imparted to first side edge 44 of top portion 6. It can be appreciated that second end 22 of first side tension cord 18 can be directly attached to or fixed to left side 106B of fence 106 without using first tension block 20.

According to the form shown, sawdust collection assembly 2 further includes a second side tension cord 18 having first and second ends 21 and 22. First end 21 of second side tension cord 18 is releasably attached to one of second attachment locations 16B at second side edge 46 by a second hook 54B. Second end 22 of second side tension cord 18 is attached to second tension block 20 fixed to right side 106A of fence 106. Specifically, second end 22 of second side tension cord 18 extends through through-hole 64 and at least one of first and second slots 70 and 72 of second tension block 20. A length of second side tension cord 18 between second hook 54B and second tension block 20 can be adjusted to adjust a tension imparted to second side edge 46 of top portion 6. It can be appreciated that second end 22 of second side tension cord 18 can be directly attached to or fixed to right side 106A of fence 106 without using second tension block 20.

Each of first and second side tension cords 18 has an initial diameter when not tensioned. Each of first and second side tension cords 18 has a reduced diameter when tensioned. The reduced diameter of each of first and second side tension cords 18 is smaller than the initial diameter of each of first and second side tension cords 18 and substantially equal to or slightly larger than the width of each of first and second slots 70 and 72. A diameter of through-hole 64 of each of first and second tension blocks 20 is at least two times the initial diameter of each of first and second side tension cords 18. First and second side tension cords 18 are made of stretchable and retractable cord materials capable of retaining stretchability and shape after repeated use. As an example, first and second side tension cords 18 can be shock cords the same as bungee cords and made of rubber strands and have a stretchability over 100%. In assembly, each of first and second side tension cords 18 is stretched to reduce its diameter and then extended through through-hole 64 and at least one of first and second slots 70 and 72 of the corresponding one of first and second tension blocks 20. In a case that that the reduced diameter of each of first and second side tension cords 18 is slightly larger than the width of each of first and second slots 70 and 72, each of first and second side tension blocks 18 has a stretched and compressed diameter inside first and/or second slots 70 and 72. First and second side tension cords 18 restore their initial diameters after tensions imparted to them vanishes, such that first and second side tension cords 18 remain wedged into place, keeping first and second side edges 44 and 46 of upper portion 6 of chute 10 in place. Nevertheless, chute 10 is stretchable when the position of saw blade 110 is changed. For removal or easy adjustment, first and second side tension cords 18 are stretched to reduce the compressed diameters, allowing first and second side tension cords 18 to be freed from first and second slots 70 and 72. First and second hooks 54B are of sufficient sizes and strengths to pull and hold top portion 6 in place for extended periods of time.

According to the form shown, sawdust collection assembly 2 further includes a window 12 mounted in top portion 6 of chute 10 and located between first and second side edges 44 and 46 of top portion 6. Window 12 includes first and second through-holes 74 and forms a part of chute 10. Window 12 is transparent and can be made of high impact unbreakable material including but not limited to polycarbonate.

According to the form shown, sawdust collection assembly 2 further includes a cord lock 34 and a rear tension cord 32. Cord lock 34 has a press button 76 and a through-hole 78. Rear tension cord 32 has an initial diameter when not tensioned. Rear tension cord 32 has a reduced diameter when tensioned. The reduced diameter of rear tension cord 32 is smaller than the initial diameter of rear tension cord 32 and substantially equal to the width of each of first and second slots 70 and 72. A diameter of through-hole 64 of rear tension block 28 is at least two times the initial diameter of rear tension cord 32. Rear tension cord 32 extends through through-hole 78 of cord lock 34, through-hole 64 of rear tension block 28, first and second through-holes 74 of window 12, through-hole 64 of rear tension block 28, and through-hole 78 of cord lock 34 in sequence. Rear tension block 28 is fixed to slide rail end cap 108 as desired. A length of rear tension cord 32 can be adjusted by operating press button 76 and moving rear tension cord 32, adjusting a tension imparted to window 12 while holding chute 10 in a desired position. It can be appreciated that rear tension cord 32 can be directly attached to slide rail end cap 108 without using rear tension block 28. Rear tension cord 32 is made of a stretchable and retractable cord material capable of retaining stretchability and shape after repeated use. Rear tension cord 32 restores its initial diameter after the tension imparted to it vanishes.

Now that the basic construction of sawdust collection assembly 2 has been explained, the operation and some of the advantages of sawdust collection assembly 2 can be set forth and appreciated. In particular, for the sake of explanation, it will be assumed that saw blade 110 is in its initial position, and chute 10 is minimally stretched by blade housing 102. A vacuum is attached to connectable vacuum hose 120. With the vacuum in an operative status, sawdust collection assembly 2 acts as a conduit for dust particles generated by an operator using saw 100. Chute 10 controls the flow of sawdust from a point proximate to the cut into the dust evacuation port (first end 104A of dust evacuation conduit 104) of saw 100 and into the vacuum. Specifically, when blade housing 102 moves in vertical and horizontal directions for moving saw blade 110 during cutting operation, chute 10 is stretched in the vertical direction (i.e., along the first axis) and in the horizontal direction (i.e., along the second axis). Thus, the sawdust path formed by chute 10 is moveable in response to movement of blade housing 102 and always in communication with the dust evacuation port, rapidly and reliably collecting sawdust. Rear tension cord 32 pulls chute 10 away from saw blade 110, preventing saw blade 110 from coming into contact with chute 10. In addition, when rear tension cord 32 is under tension during non-sliding types of cuts, a pocket will be formed in chute 10 which facilitates the flow of sawdust coming from different directions as determined by the size of the workpiece, as well as the angle and depth of cut being performed. First and second side bars 16 and first and second side edges 44 and 46 form outer edges of the pocket and act to divert sawdust chips into the pocket and out to the vacuum.

Furthermore, top and bottom portions 6 and 8 are more stable and keep chute 10 in position and not wrinkled, preventing sawdust flow issues and avoiding frequent cleaning resulting from building up of sawdust. The smooth surface 52 of top portion 6 deflects the sawdust into the sawdust path during operation of saw blade 110. Top and bottom portions 6 and 8 recover after stretching, allowing repeated use. Since chute 10 fits around blade housing 102 and fits around rear side 106C of fence 106, the area of the sawdust path is covered regardless of the size, angle, bevel or depth of cut. In a case that saw 100 includes a rear mounted laser light alignment mechanism, window 12 is positioned so that laser lights will function properly.

Since loops 84A of surface 84 of bottom portion 8 are removably and reattachably engaged with hooks 26C of bottom attachment member 26, chute 10 can be attached to saws 100 having varying vertical dimensions between the top and bottom attachment points. Furthermore, first and second attachment locations 16A and 16B allow selective affixing of first and second side tension cords 18 such that the outer edges of the pocket are adjustable to optimal positions for dust evacuation on a multitude of sizes and designs of saws, both static and sliding types, and to accommodate all angles and depths of cut. Thus, sawdust collection assembly 2 is a universal fit for saws 100 of various types and is adjustable to a multitude of different saw designs while allowing a wide variety of quick and easy adjustments of first and second side tension cords 18. Sawdust collection assembly 2 is also adjustable to maximize sawdust collection during a variety of different saw operations including angles, bevels and sliding through large pieces of wood. Namely, sawdust collection assembly 2 can provide a satisfactory effect in various wood cutting conditions including the depth of cut, the size of the work piece, the angle of the cut, the bevel angle, the size and speed of the saw blade, how quickly the saw blade is pushed into the work piece by the saw operator and especially when a singular cutting operation involves a combination of any and all of these cutting variables. Sawdust collection assembly 2 is a low cost solution to a very common problem among woodworkers, contractors, and do-it-yourself operators. Sawdust collection assembly 2 allow saw operators to cut workpieces indoors and on job site and as such save significant amounts of time and money.

Now that the basic teachings have been explained, many extensions and variations will be obvious to one having ordinary skill in the art. For example, first and second tension blocks 20 and rear tension block 28 can be attached to any desired places according to the model and type of saw 100. As an example, in a case that saw 100 is of non-sliding type and has a pivot base, two ends of rear tension cord 32 pass around opposite sides of the pivot base of saw 100 and are then secured by cord lock 34. Furthermore, in a case that saw 100, whether sliding or non-sliding type, includes a base having a bottom swivel, rear tension cord 32 can be used to put tension on window 12 by putting an end of rear tension cord 32 around a left side of the bottom swivel of the base of saw 100 and the other end around a right side of the base of saw 100 and securing both sides of rear tension cord 32 with cord lock 34.

Furthermore, one or more of first and second tension blocks 20 and rear tension block 28 can be used together with other components, such as stretchable and non-stretchable cords, interlocking fasteners, screws, spacers, etc. to form a kit for attaching objects to walls, doors, etc. and can be for home, marine and commercial use. Each of first and second tension blocks 20 and rear tension block 28 can be drilled to form a screw hole in a center thereof, allowing first and tension blocks 20 and rear tension block 28 to be mounted to walls, doors, etc. by a screw. Furthermore, the overall width of each of first and second tension blocks 20 and rear tension block 28 in the width direction can be increased to form a double block, and through-hole 64 and first and second slots 70 and 72 can be formed in each of two ends of each of first and second tension blocks 20 and rear tension block 28. Each double block can be drilled to form a screw hole between two ends, allowing the double block to be mounted to walls, doors, etc. As an example, the kit can be used to attach a bicycle to the wall and so that the bicycle does not move. As another example, the kit can be used to lash golf clubs to a wall so that the golf clubs do not fall or move. In a further example, the kit can be used to organize garden tools like rakes, shovels, etc. by either lashing the garden tools to a wall or using the kit as hangers for each individual garden tool.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A sawdust collection assembly, comprising, in combination:
   a chute including a top portion and a bottom portion, with the top portion including an upper end, with the bottom portion including a bottom end spaced from the upper end of the top portion along a first axis, with the top portion further including first and second side edges spaced from each other along a second axis perpendicular to the first axis, with the chute formed of a material having a stretchability to be shaped responsive to movement of a blade housing of a saw into a moveable sawdust path, with the moveable sawdust path adapted to be in communication with a dust evacuation port in the blade housing of the saw;
   a top attachment member being flexible and adapted to be mounted to the blade housing of the saw and having a shape approximating the blade housing, with the upper end of the top portion removably and reattachably engaged with the top attachment member;
   a bottom attachment member adapted to be mounted to a rear side of a fence of the saw and having a shape approximating the rear side of the fence, with the bottom attachment member being flexible, with the bottom portion removably and reattachably engaged with the bottom attachment member, with the bottom attachment member located below the top attachment member along the first axis;
   at least one first attachment location at the first side edge of the top portion;
   at least one second attachment location at the second side edge of the top portion;
   a first side tension cord including first and second ends, with the first end of the first side tension cord attached to the at least one first attachment location, with the fence of the saw including left and right sides on opposite sides of the rear side of the fence, with the second end of the first side tension cord adapted to be attached to the left side of the fence of the saw; and
   a second side tension cord including first and second ends, with the first end of the second side tension cord attached to the at least one second attachment location, with the second end of the second side tension cord adapted to be attached to the right side of the fence of the saw.

2. The sawdust collection assembly as claimed in claim 1, further comprising, in combination:
   a first side bar mounted to and extending along the first side edge of the top portion, with the first side bar defining the at least one first attachment location, with the at least one first attachment location including a plurality of first attachment locations at the first side edge of the top portion, with the plurality of first attachment locations spaced from each other along the first axis and along the first side bar; and
   a second side bar mounted to and extending along the second side edge of the top portion, with the second side bar defining the at least one second attachment location, with the at least one second attachment location including a plurality of second attachment locations at the second side edge of the top portion, with the plurality of second attachment locations spaced from each other along the first axis and along the second side bar.

3. The sawdust collection assembly as claimed in claim 2, with the first side bar being an elastic bar sewn to the first side edge of the top portion at a plurality of first, spaced, stitching locations, with each of the plurality of first attachment locations located between two adjacent first, spaced, stitching locations of the first side bar, with the second side bar being an elastic bar sewn to the second side edge of the top portion at a plurality of second, spaced, stitching locations, with each of the plurality of second attachment locations located between two adjacent second, spaced, stitching locations of the second side bar.

4. The sawdust collection assembly as claimed in claim 3, further comprising, in combination:
   a first tension block adapted to be fixed to the left side of the fence, with the first end of the first side tension cord releasably attached to one of the plurality of first attachment locations by a first hook, with the second end of the first side tension cord fixed to the first tension block, and
   a second tension block adapted to be fixed to the right side of the fence, with the first end of the second side tension cord releasably attached to one of the plurality of second attachment locations by a second hook, with the second end of the second side tension cord fixed to the second tension block,
   with each of the first and second tension blocks including:
   a first side and a second side opposite to the first side in a thickness direction, with a through-hole extending from the first side through the second side;
   a first edge and a second edge opposite to the first edge in a length direction perpendicular to the thickness direction, with the first and second edges extending between the first and second sides, with a first slot extending from the first edge towards but spaced from the second edge, with a second slot extending from the second edge towards but spaced from the first edge, with the second slot aligned with the first slot, with the through-hole spaced from and located between the first and second slots; and
   an attachment mechanism provided on the first side,
   with the first side tension cord extending through the through-hole and at least one of the first and second slots of the first tension block,
   with the second side tension cord extending through the through-hole and at least one of the first and second slots of the second tension block,
   with the attachment mechanism of the first tension block adapted to be fixed to the left side of the fence, and
   with the attachment mechanism of the second tension block adapted to be fixed to the right side of the fence.

5. The sawdust collection assembly as claimed in claim 1, with the top portion further including a lower end spaced from the upper end of the top portion along the first axis, with the first and second side edges extending between the upper and lower ends of the top portion, with the bottom portion further including a top end spaced from the bottom end along the first axis, with the top end of the bottom portion fixed to the lower end of the top portion, with each of the top and bottom portions being elastic and stretchable along the first and second axes.

6. The sawdust collection assembly as claimed in claim 5, with the top portion made of a material having a stretchability of approximately 200% along the first axis and approximately 100% along the second axis, with the bottom portion made of a material having a stretchability of approximately 100% along the first axis and approximately 60% along the second axis.

7. The sawdust collection assembly as claimed in claim 6, further comprising, in combination: a saw attachment member fixed to the upper end of the top portion, with the saw attachment member being flexible, with the saw attachment member removably and reattachably engaged with the top attachment member, with the bottom portion of the chute further including third and fourth side edges extending between the top and bottom ends of the bottom portion, with the third side edge linearly aligned with the first side edge of the top portion, with the fourth side edge linearly aligned with the second side edge of the top portion, with the top attachment member including first and second sides, with the first side of the top attachment member including a plurality of hooks, with the second side of the top attachment member adapted to be fixed to the blade housing, with the saw attachment member including a plurality of loops releasably and reattachably engaged with the plurality of hooks of the top attachment member, with the bottom attachment member including first and second sides, with the first side of the bottom attachment member including a plurality of hooks, with the second side of the bottom attachment member adapted to be fixed to the rear side of the fence, with the bottom portion including a surface having a plurality of loops, with the plurality of loops of the bottom portion releasably and reattachably engaged with the plurality of hooks of the bottom attachment member, with the top portion including a surface, with the surface of the top portion being smooth and facing the top attachment member, with the surface of the top portion adapted to deflect sawdust generated during operation of the saw blade of the saw.

8. The sawdust collection assembly as claimed in claim 7, with a length of the bottom end of the bottom portion along the second axis being larger than a length of the upper end of the top portion along the second axis, with a length of the top end of the bottom portion along the second axis being equal to a length of the lower end of the top portion along the second axis, with the chute being substantially trapezoidal.

9. The sawdust collection assembly as claimed in claim 1, further comprising, in combination:
   a window mounted in the top portion of the chute and located between the first and second side edges of the top portion, with the window forming a part of the chute; and
   a rear tension cord extending through the window, with the rear tension cord adapted to be attached to the saw, with the rear tension cord having an adjustable length to adjust a tension imparted to the window.

10. A saw comprising, in combination:
    a blade housing including a dust evacuation port, with the dust evacuation port adapted to be connected to a vacuum;
    a saw blade rotatably supported in the blade housing;
    a fence including left and right sides and a rear side between the left and right sides;
    a chute including a top portion and a bottom portion, with the top portion including an upper end, with the bottom portion including a bottom end spaced from the upper end of the top portion along a first axis, with the top portion further including first and second side edges spaced from each other along a second axis perpendicular to the first axis, with the chute formed of a material having a stretchability to be shaped responsive to movement of the blade housing into a moveable sawdust path, with the moveable sawdust path being in communication with the dust evacuation port;
    a top attachment member mounted to the blade housing and having a shape approximating the blade housing, with the top attachment member being flexible, with the upper end of the top portion removably and reattachably engaged with the top attachment member;
    a bottom attachment member mounted to the rear side of the fence and having a shape approximating the rear side of the fence, with the bottom attachment member being flexible, with the bottom portion removably and reattachably engaged with the bottom attachment member, with the bottom attachment member located below the top attachment member along the first axis;

at least one first attachment location at the first side edge of the top portion;

at least one second attachment location at the second side edge of the top portion;

a first side tension cord including first and second ends, with the first end of the first side tension cord attached to the at least one first attachment location, with the second end of the first side tension cord attached to the left side of the fence; and a second side tension cord including first and second ends, with the first end of the second side tension cord attached to the at least one second attachment location, with the second end of the second side tension cord attached to the right side of the fence.

11. The saw as claimed in claim 10, further comprising, in combination:

a first side bar mounted to and extending along the first side edge of the top portion, with the first side bar defining the at least one first attachment location, with the at least one first attachment location including a plurality of first attachment locations at the first side edge of the top portion, with the plurality of first attachment locations spaced from each other along the first axis and along the first side bar; and a second side bar mounted to and extending along the second side edge of the top portion, with the second side bar defining the at least one second attachment location, with the at least one second attachment location including a plurality of second attachment locations at the second side edge of the top portion, with the plurality of second attachment locations spaced from each other along the first axis and along the second side bar.

12. The saw as claimed in claim 11, with the first side bar being an elastic bar sewn to the first side edge of the top portion at a plurality of first, spaced, stitching locations, with each of the plurality of first attachment locations located between two adjacent first, spaced, stitching locations of the first side bar, with the second side bar being an elastic bar sewn to the second side edge of the top portion at a plurality of second, spaced, stitching locations, with each of the plurality of second attachment locations located between two adjacent second, spaced, stitching locations of the second side bar.

13. The saw as claimed in claim 12, further comprising, in combination:

a first tension block fixed to the left side of the fence, with the first end of the first side tension cord releasably attached to one of the plurality of first attachment locations by a first hook, with the second end of the first side tension cord fixed to the first tension block; and a second tension block fixed to the right side of the fence, with the first end of the second side tension cord releasably attached to one of the plurality of second attachment locations by a second hook, with the second end of the second side tension cord fixed to the second tension block, with each of the first and second tension blocks including:

a first side and a second side opposite to the first side in a thickness direction, with a through-hole extending from the first side through the second side;

a first edge and a second edge opposite to the first edge in a length direction perpendicular to the thickness direction, with the first and second edges extending between the first and second sides, with a first slot extending from the first edge towards but spaced from the second edge, with a second slot extending from the second edge towards but spaced from the first edge, with the second slot aligned with the first slot, with the through-hole spaced from and located between the first and second slots; and an attachment mechanism provided on the first side, with the first side tension cord extending through the through-hole and at least one of the first and second slots of the first tension block, with the second side tension cord extending through the through-hole and at least one of the first and second slots of the second tension block, with the attachment mechanism of the first tension block fixed to the left side of the fence, and with the attachment mechanism of the second tension block fixed to the right side of the fence.

14. The saw as claimed in claim 10, with the top portion further including a lower end spaced from the upper end of the top portion along the first axis, with the first and second side edges extending between the upper and lower ends of the top portion, with the bottom portion further including a top end spaced from the bottom end along the first axis, with the top end of the bottom portion fixed to the lower end of the top portion, with each of the top and bottom portions being elastic and stretchable along the first and second axes.

15. The saw as claimed in claim 14, with the top portion made of a material having a stretchability of approximately 200% along the first axis and approximately 100% along the second axis, with the bottom portion made of a material having a stretchability of approximately 100% along the first axis and approximately 60% along the second axis.

16. The saw as claimed in claim 15, further comprising, in combination: a saw attachment member fixed to the upper end of the top portion, with the saw attachment member being flexible, with the saw attachment member removably and reattachably engaged with the top attachment member, with the bottom portion of the chute further including third and fourth side edges extending between the top and bottom ends of the bottom portion, with the third side edge linearly aligned with the first side edge of the top portion, with the fourth side edge linearly aligned with the second side edge of the top portion.

17. The saw as claimed in claim 16, with a length of the bottom end of the bottom portion along the second axis being larger than a length of the upper end of the top portion along the second axis, with a length of the top end of the bottom portion along the second axis being equal to a length of the lower end of the top portion along the second axis, with the chute being substantially trapezoidal.

18. The saw as claimed in claim 17, with the top attachment member including first and second sides, with the first side of the top attachment member including a plurality of hooks, with the second side of the top attachment member fixed to the blade housing, with the saw attachment member including a plurality of loops releasably and reattachably engaged with the plurality of hooks of the top attachment member, with the bottom attachment member including first and second sides, with the first side of the bottom attachment member including a plurality of hooks, with the second side of the bottom attachment member fixed to the rear side of the fence, with the bottom portion including a surface having a plurality of loops, with the plurality of loops of the bottom portion releasably and reattachably engaged with the plurality of hooks of the bottom attachment member, with the top portion including a surface, with the surface of the top portion being smooth and facing the top attachment member, with the surface of the top portion adapted to deflect sawdust generated during operation of the saw blade of the saw.

19. The saw as claimed in claim 10, further comprising, in combination:
   a window mounted in the top portion of the chute and located between the first and second side edges of the top portion, with the window forming a part of the chute; and
   a rear tension cord extending through the window, with the rear tension cord adapted to be attached to the saw, with the rear tension cord having an adjustable length to adjust a tension imparted to the window.

\* \* \* \* \*